United States Patent
Allen et al.

[11] Patent Number: 5,826,542
[45] Date of Patent: Oct. 27, 1998

[54] SQUIRREL BAFFLE

[76] Inventors: Danny T. Allen, 4714 Highwood Dr., Fort Wayne, Ind. 46815; Kirt A. Daenens, 6323 Fine Meadows La., Fort Wayne, Ind. 46835

[21] Appl. No.: 950,893

[22] Filed: Oct. 15, 1997

[51] Int. Cl.[6] ................................................. A01K 129/00
[52] U.S. Cl. ........................................................ 119/57.9
[58] Field of Search ................... 119/52.3, 57.9, 119/815; 248/200.1, 201, 205.1, 207, 218.4, 219.3, 225.31, 219.4, 316.6; 114/221 R; 52/101

[56] References Cited

U.S. PATENT DOCUMENTS

| | | | |
|---|---|---|---|
| 2,488,466 | 11/1949 | Carver | 43/65 |
| 2,513,141 | 6/1950 | Carder et al. | 114/221 |
| 2,525,234 | 10/1950 | Mucke | 114/221 |
| 3,194,203 | 7/1965 | Thornton | 114/221 |
| 5,291,855 | 3/1994 | Laverty | 119/59.9 |
| 5,293,721 | 3/1994 | Richard et al. | 119/57.9 |
| 5,293,835 | 3/1994 | Shagoury | 119/57.9 |
| 5,347,769 | 9/1994 | Dinsmore | 52/101 |
| 5,570,652 | 11/1996 | Ferland | 114/221 |
| 5,642,687 | 7/1997 | Nylen et al. | 119/57.9 |

Primary Examiner—Thomas Price
Attorney, Agent, or Firm—Baker & Daniels

[57] ABSTRACT

A squirrel baffle assembly for mounting on a power line. The baffle assembly includes a sleeve member which has a cylindrical shell element. The cylindrical shell has a longitudinally extending opening for its entire length through which the power line may be laterally received into the sleeve. The cylindrical shell includes apertures through which electrical ties are inserted to secure the sleeve to the power line. The baffle member has an inner opening, an outer perimeter and a slot running from the inner opening to the outer perimeter. The power line is laterally received in the inner opening through the slot. Two collar members on the exterior of the sleeve define a groove in which the radial innermost portion of the baffle member is disposed. After positioning the baffle member in the groove between the collar members, the portions of the baffle adjacent the slot are overlapped and the baffle is secured to itself with electrical ties. Overlappingly securing the baffle to itself closes the inner opening about the sleeve and causes the baffle to form a generally frustoconical shape which obstructs the passage of squirrels along the power line.

20 Claims, 3 Drawing Sheets

SQUIRREL BAFFLE

BACKGROUND OF THE INVENTION

1. Field of the Invention.

The present invention relates to an apparatus for controlling the movement of squirrels, and, more particularly, to an apparatus which prevents squirrels from traveling along a power line.

2. Description of the Related Art.

A wide variety of devices have been employed to control squirrels, oftentimes in an effort to prevent the squirrels from accessing a bird feeder. Downwardly pointed sheet metal conical devices are often employed around a post which supports a bird feeder to prevent squirrels from climbing the post to deplete the bird feeder.

Squirrels, however, interfere not only with suburban bird feeders but may also interfere with the electrical grid. Squirrels are known to travel along power lines and thereby gain access to electrical substations and other electrical equipment where they are capable of causing extensive damage. An economical and effective method of preventing their access to such equipment is desired.

SUMMARY OF THE INVENTION

The present invention provides an economical squirrel baffle which can be easily installed on a power line to prevent the passage of squirrels along the power line.

The invention comprises, in one form thereof, a sleeve having a longitudinal opening which permits the sleeve to be installed on an existing power line. The sleeve is attached to the power line using as common electrical ties. A relatively thin and flexible slotted disk is then positioned around the sleeve and attached to itself to form a conically shaped baffle. The baffle member has an inner opening which encircles the sleeve member. The radial inner portion of the baffle member is positioned in a groove between two collar elements on the sleeve and is thereby retained in a desired longitudinal position on the power line. The baffle member extends radially outward a distance which is sufficient to obstruct the passage of squirrels along the power line.

An advantage of the present invention is that it is economical to manufacture and effectively obstructs the passage of squirrels along a power line.

Another advantage of the invention is that it is easily installed on an existing power line. The sleeve has a longitudinal opening which permits the power line to be laterally received into the sleeve instead of being "threaded" through a completely circular opening in the sleeve. The baffle member also includes a slot which allows the power line to be laterally received into the inner opening in the baffle member. Both the sleeve and the baffle member can be installed using common electrical ties thereby providing a quick and simplified method of installation.

Yet another advantage of the invention is that it may be almost entirely manufactured of nonconducting plastic materials making it suitable for use on power lines.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
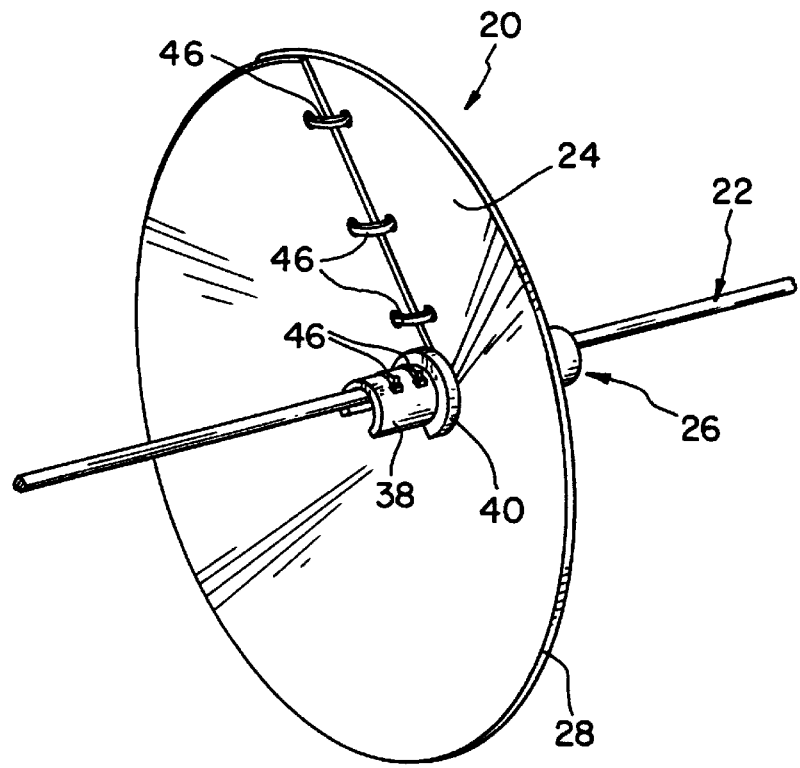
FIG. 1 is a perspective view of a baffle assembly in accordance with the present invention.

Corresponding reference characters indicate corresponding parts throughout the several views. Although the drawings represent an embodiment of the present invention, the drawings are not necessarily to scale and certain features may be exaggerated. The embodiment described below is set out as an exemplification of the invention. The described embodiment is not intended to be exhaustive or to be construed as limiting the scope of the invention to the precise form disclosed.

DESCRIPTION OF THE PRESENT INVENTION

Referring now to the drawings and particularly to FIG. 1, there is shown a squirrel baffle assembly 20 attached to a power line 22. When baffle assembly 20 is installed on power line 22, baffle assembly 20 obstructs the passage of squirrels along power line 22.

Figure 2:
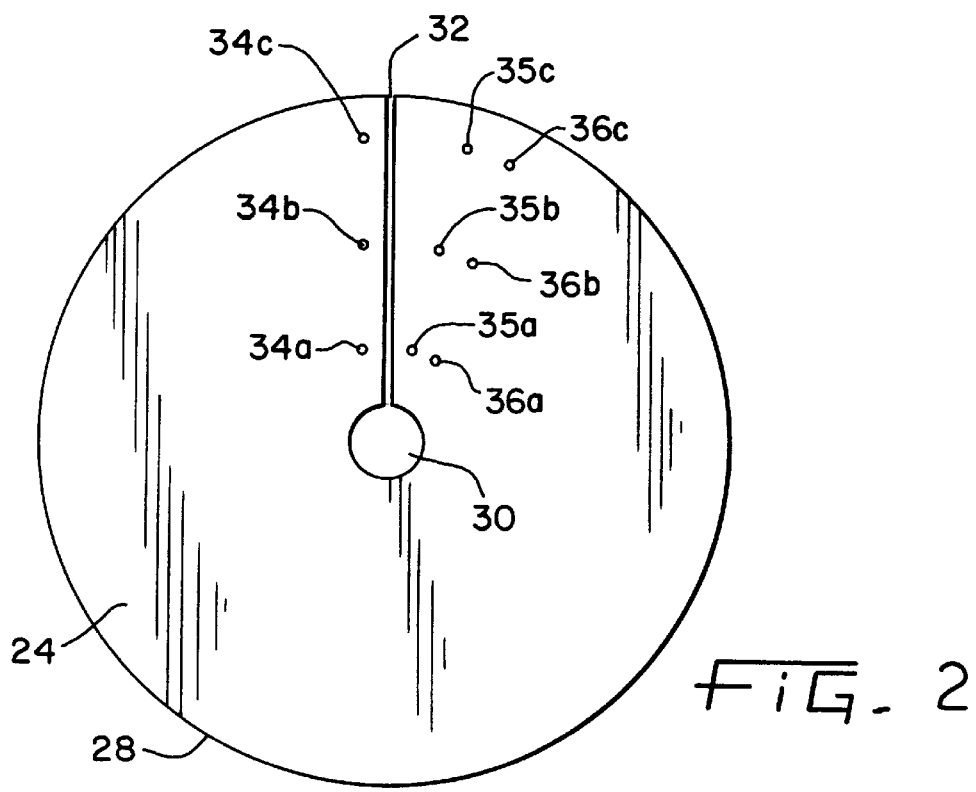
FIG. 2 is a front view of the baffle member prior to its installation.
Figure 3:
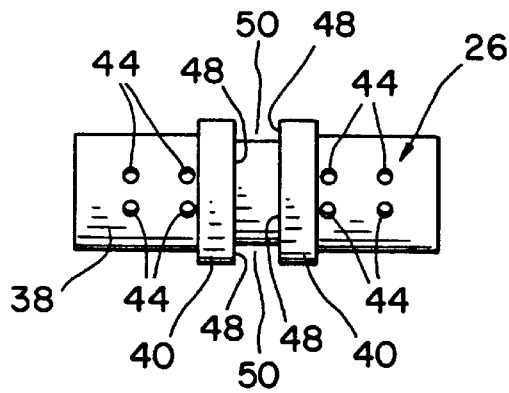
FIG. 3 is a top view of the sleeve member.

The two main components of baffle assembly 20 are baffle member 24 and sleeve member 26 which are respectively shown in FIGS. 2 and 3. Baffle member 24 is formed of a 3/32 inch thick HDPE, i.e., high density polyethylene, black material. Other materials which are suitably durable and flexible, however, may also be used to form baffle member 24. Baffle member 24 has a circular outer perimeter 28, an inner opening 30 and a slot, or slit, 32 extending from inner opening 30 to outer perimeter 28. Outer perimeter 28, in the disclosed embodiment, has a diameter of 24 inches and inner opening 30 has a diameter of 1¾ inches. Baffle member 24 also includes a plurality of attachment holes 34a–c, 35a–c and 36a–c for attaching the baffle to itself as described in greater detail below. When installed on a power line, baffle member 24 extends radially outwards a sufficient distance to generally prevent squirrels from passing along the power line.

Figure 4:
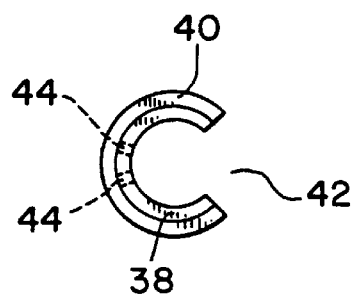
FIG. 4 is a front view of the sleeve member.

Sleeve 26 is illustrated in FIGS. 3 and 4 and includes a partially cylindrical element 38 having a C-shaped cross section and two collar elements 40. Cylindrical element 38 is a short length of plastic pipe which has been cut to remove a longitudinal portion of the pipe and thereby form a longitudinal opening 42. In the illustrated embodiment, a 6 inch length of 2 inch diameter PVC, i.e., polyvinyl chloride, pipe is used to form cylindrical element 38. Longitudinal opening 42 permits sleeve 26 to be easily mounted on an existing power line 22 or other elongate element. Power line 22 is laterally receivable within the interior of cylindrical element 38 via longitudinal opening 42 and, thus, there is no need to "thread" a free end of power line 22 through sleeve 26. ("Longitudinal" is used herein to refer to the direction in which the axis of cylindrical element 38 extends while "lateral" is used to refer to a direction generally perpendicular to the longitudinal axis of cylindrical element 38.)

Figure 6:
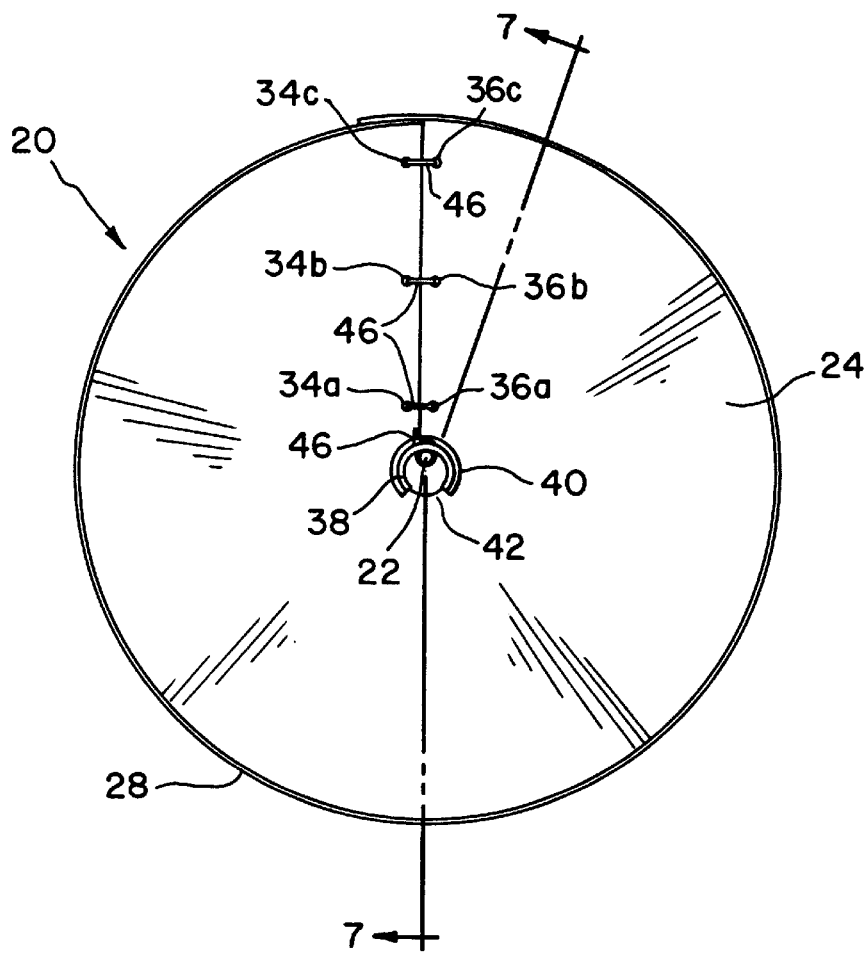
FIG. 6 is a front view of an installed baffle assembly.
Figure 5:
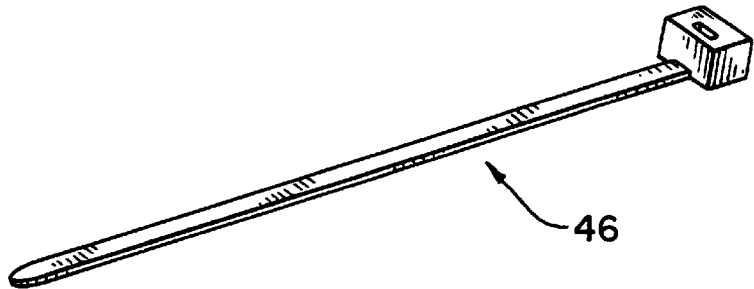
FIG. 5 is a perspective view of an electrical tie.

Sleeve 26 also includes apertures 44 which are ¼ inch diameter holes in cylindrical element 38. In the illustrated embodiment, apertures 44 are located in four sets of two. The outermost aperture sets are longitudinally spaced 1 inch from the ends of cylindrical element 38 and the innermost aperture sets are longitudinally spaced 1 inch from the outermost sets. Each set of two apertures 44 have their centerlines laterally spaced by approximately ½ inch. This spacing of the apertures can be used to attach a wide variety of differently sized power lines to sleeve 26. It is also possible, however, to vary the spacing of apertures 44 depending upon the size of the elongate element to which sleeve 26 is intended to be attached. After a longitudinal portion of power line 22 is received within, and substantially encircled by, the relatively large diameter cylindrical element 38, power line 22 is positioned between the apertures 44 of each of the sets of two apertures 44. A well known and commonly available electrical tie 46, shown in FIG. 5, is then inserted through each set of apertures 44. Electrical ties 46 encircle power line 22 and secure power line 22 to cylindrical element 38 as shown in FIG. 6. Ties 46 are tightened sufficiently to prevent the longitudinal displacement of sleeve 26 relative to generally horizontal power line 22.

After sleeve 26 has been secured to power line 22, baffle 24 is installed on sleeve 26. Sleeve 26 is laterally received into inner opening 30 by flexing baffle 24 to laterally pass sleeve 22 through slot 32. Baffle 24 can be installed either directly over sleeve 26, or over power line 22 and subsequently longitudinally positioned over sleeve 26. Baffle 24 is positioned such that the inner radial portion of baffle 24 adjacent inner opening 30 is located between collar members 40. A recessed groove and collar members 40 define laterally extending exterior surfaces 48 which together define groove 50 in which the inner radial portion of baffle 24 is disposed. Baffle assembly 20 will generally be installed on a substantially horizontal portion of a power line 22 and thus, laterally extending surfaces 48 and groove 50 will be substantially vertically oriented. The illustrated embodiment has a groove which is approximately ¼ inch deep and extends approximately ¼ inch in the longitudinal direction. Laterally extending surfaces 48 limit the longitudinal movement of baffle 24 and thereby longitudinally secure baffle 24 to sleeve 26. Collar members 40 are made from PVC piping materials. Although not illustrated, laterally extending surfaces 48 could also be entirely defined by a recessed groove or entirely by collar members. It would also be possible to form sleeve 26 by injection molding a single integral sleeve member having either projecting collar members or a recessed groove.

After baffle 24 is positioned between laterally extending surfaces 48, the portions of baffle 24 adjacent opposite sides of slot 32 are overlapped and attached together. Attaching the baffle to itself across slot 32 closes and tightens inner opening 30 about sleeve 26 and causes baffle 24 to assume a generally frustoconical shape. Baffle 24 is secured to itself using electrical ties 46, however, alternative fasteners may also be employed.

In the illustrated embodiment, ¼ inch diameter holes 34a–c, 35a–c, and 36a–c are drilled in baffle 24 through which ties 46 are inserted. Holes 34a–c, 35a–c and 36a–c are respectively located on three radial lines. Innermost holes 34a, 35a, 36a are located proximate inner opening 30 at a common distance, intermediate holes 34b, 35b, 36b are located approximately midway between inner opening 30 and outer perimeter 28 while outermost holes 34c, 35c, 36c are located proximate outer perimeter 28 at a common distance from inner opening 30. To fasten baffle 24 together holes 34a, 34b, and 34c are positioned over holes 35a, 35b and 35c respectively and eletrical ties are inserted through the overlapped holes and holes 36a–c. FIGS. 1 and 6 illustrate how ties 46 are used to fasten baffle 24 to itself.

Figure 7:
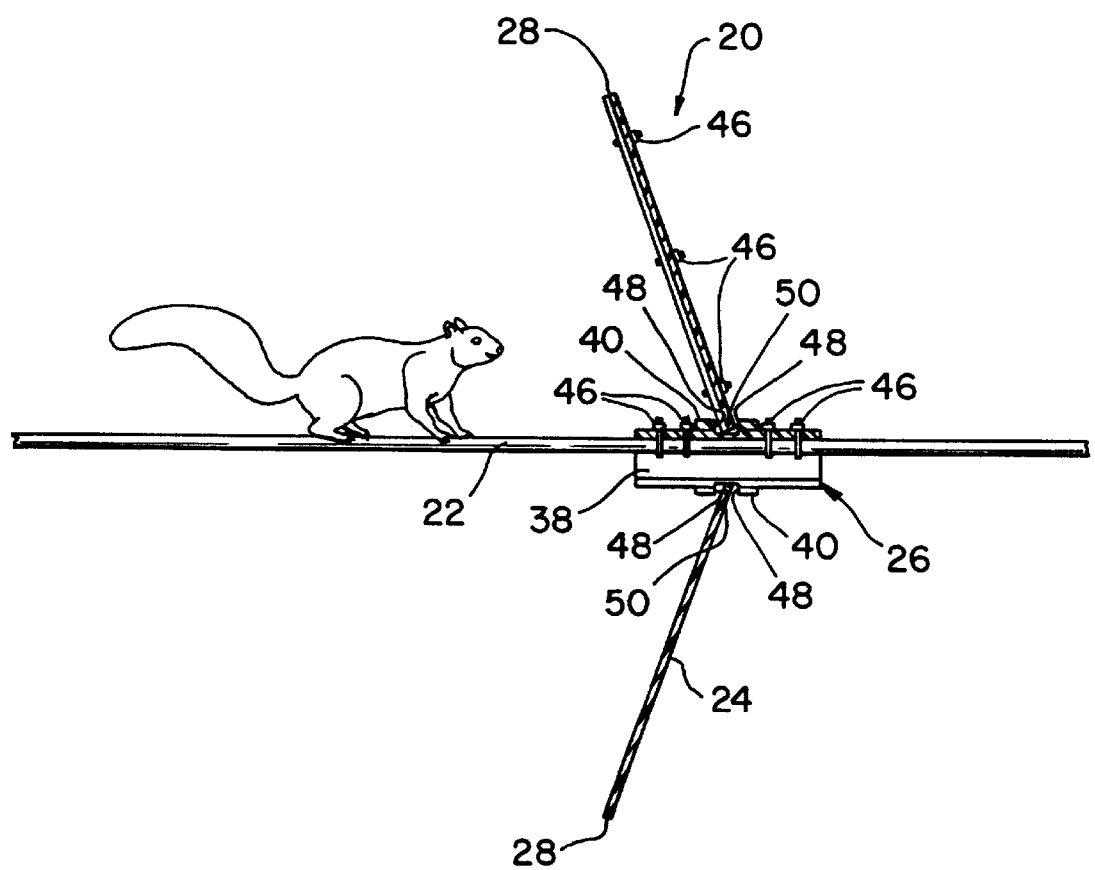
FIG. 7 is a cross sectional view of an installed baffle assembly taken along line 7—7 of FIG. 6.

Baffle 24 is positioned so that baffle 24 forms a generally conical shape with the base of the cone positioned nearest the direction from which squirrels will approach baffle assembly 20 as can be seen in FIG. 7. By using plastic nonconductive materials to manufacture baffle assembly 20, the safety hazards associated with placing an object on a power line can be minimized. The illustrated embodiment consists essentially of plastic nonconductive materials although electrical ties 46 may contain a small amount of metal.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A squirrel baffle assembly mountable on an elongate element, the elongate element extending in a longitudinal direction, said baffle assembly comprising:

a sleeve member substantially encircling a longitudinally extending portion of the elongate element, said sleeve member having a longitudinally extending opening whereby the elongate element is laterally receivable within said sleeve member;

first and second laterally extending exterior surfaces disposed on said sleeve, said lateral surfaces defining a groove therebetween; and a baffle member having an outer perimeter, an inner opening, and a slit extending from said inner opening to said outer perimeter (whereby) the elongate element is laterally receivable in said inner opening through said slit, portions of said baffle member adjacent opposite sides of said slit being attachable together, whereby attachment of said baffle portions adjacent opposite slit sides closes said inner opening about said sleeve member and disposes a radial inner portion of said baffle member between said first and second laterally extending surfaces to thereby secure said baffle member to said sleeve member.

2. The baffle assembly of claim 1 wherein said sleeve member comprises a generally cylindrical shell having a generally C-shaped cross section.

3. The baffle assembly of claim 1 wherein said sleeve further comprises first and second collar elements and said first and second laterally extending exterior surface are respectively disposed on said first and second collar elements.

4. The baffle assembly of claim 1 wherein said sleeve member has a plurality of apertures extending therethrough and said assembly further comprises a plurality of ties insertable through said plurality of apertures whereby the elongate element is securable to the sleeve member with said plurality of ties.

5. The baffle assembly of claim 1 wherein said sleeve member comprises a length of plastic pipe.

6. The baffle assembly of claim 1 wherein said baffle portions adjacent opposite slit sides further comprise a plurality of apertures and said assembly further comprises a plurality of fasteners insertable through said apertures for securing together said baffle portions adjacent opposite slit sides.

7. The baffle assembly of claim 6 wherein said plurality of fasteners comprises a plurality of ties.

8. The baffle assembly of claim 1 wherein said baffle assembly consists essentially of nonconducting materials.

9. A squirrel baffle assembly mountable on an elongate element, the elongate element extending in a longitudinal direction, said baffle assembly comprising:

a sleeve member having a longitudinal length and a generally C-shaped cross section, the elongate element being laterally receivable in said sleeve member, said sleeve member attachable to the elongate member whereby a longitudinally extending portion of the elongate element is securably positionable within and substantially encircleable by said sleeve member;

first and second laterally extending exterior surfaces disposed on said sleeve, said lateral surfaces defining a groove therebetween; and a flexible baffle member having an outer perimeter, an inner opening, and a slit extending from said inner opening to said outer perimeter whereby the elongate element is laterally receivable in said inner opening through said slit, portions of said baffle member adjacent said slit being overlappable and attachable together, whereby attachment of said overlappable baffle portions closes said inner opening about said sleeve member and disposes a radial inner portion of said baffle member between said first and second laterally extending surfaces to thereby secure said baffle member to said sleeve member.

10. The baffle assembly of claim 9 wherein said baffle member has a substantially circular outer perimeter and is generally conically shaped when said overlappable baffle portions are attached together.

11. The baffle assembly of claim 9 wherein said sleeve further comprises first and second collar elements and said first and second laterally extending exterior surfaces are respectively disposed on said first and second collar elements.

12. The baffle assembly of claim 9 wherein said sleeve member has a plurality of apertures extending therethrough and said assembly further comprises a plurality of ties insertable through said apertures whereby the elongate element is securable to the sleeve member with said plurality of ties.

13. The baffle assembly of claim 9 wherein said sleeve member comprises a length of plastic pipe.

14. The baffle assembly of claim 9 wherein said overlappable baffle portions further comprise a plurality of apertures and said assembly further comprises a plurality of fasteners insertable through said apertures for securing together said overlappable baffle portions.

15. The baffle assembly of claim 14 wherein said plurality of fasteners comprises a plurality of ties.

16. The baffle assembly of claim 9 wherein said baffle assembly consists essential of nonconducting materials.

17. A squirrel baffle assembly mountable on a substantially horizontal elongate element, the elongate element extending in a longitudinal direction; said baffle assembly comprising:

a sleeve member attachable to the substantially horizontal elongate member;

first and second laterally extending exterior surfaces disposed on said sleeve member, said lateral surfaces defining a substantially vertically oriented groove therebetween; and a baffle member having an outer perimeter, an inner opening, and a slit extending from said inner opening to said outer perimeter whereby the elongate member is laterally receivable in said inner opening through said slit, portions of said baffle member adjacent opposite sides of said slit being attachable together, whereby attachment of said baffle portions adjacent opposite slit sides closes said inner opening about said sleeve member and disposes a radial inner portion of said baffle member between said first and second laterally extending surfaces to thereby secure said baffle member to said sleeve member.

18. The baffle assembly of claim 17 wherein said sleeve member comprises a generally cylindrical shell having a generally C-shaped cross section.

19. The baffle assembly of claim 17 wherein said sleeve further comprises first and second collar elements and said first and second laterally extending exterior surfaces are respectively disposed on said first and second collar elements.

20. The baffle assembly of claim 17 wherein said baffle assembly consists essentially of nonconducting materials.

* * * * *

UNITED STATES PATENT AND TRADEMARK OFFICE
CERTIFICATE OF CORRECTION

PATENT NO. : 5,826,542
DATED : October 27, 1998
INVENTOR(S) : Danny T. Allen et al It is certified that error appears in the above-identified patent and that said Letters Patent is hereby corrected as shown below:

Claim 16, Col. 6, Line 9 delete "essential" and insert --essentially--.

Signed and Sealed this

Sixteenth Day of March, 1999

Attest:

Q. TODD DICKINSON

Attesting Officer

Acting Commissioner of Patents and Trademarks